US011463527B2

(12) United States Patent
Rommer et al.

(10) Patent No.: US 11,463,527 B2
(45) Date of Patent: Oct. 4, 2022

(54) USER PLANE MODEL FOR NON-3GPP ACCESS TO FIFTH GENERATION CORE NETWORK

(71) Applicant: TELEFONAKTIEBOLAGET LM ERICSSON (PUBL), Stockholm (SE)

(72) Inventors: Stefan Rommer, Västra Frölunda (SE); Gunnar Rydnell, Gothenburg (SE); Daniel Nilsson, Älvängen (SE); Qian Chen, Mölndal (SE)

(73) Assignee: Telefonaktiebolaget L M Ericsson (publ), Stockholm (SE)

( * ) Notice: Subject to any disclaimer, the term of this patent is extended or adjusted under 35 U.S.C. 154(b) by 513 days.

(21) Appl. No.: 16/348,554

(22) PCT Filed: Nov. 9, 2017

(86) PCT No.: PCT/IB2017/057021
§ 371 (c)(1),
(2) Date: May 9, 2019

(87) PCT Pub. No.: WO2018/087696
PCT Pub. Date: May 17, 2018

(65) Prior Publication Data
US 2019/0364420 A1 Nov. 28, 2019

Related U.S. Application Data

(60) Provisional application No. 62/420,843, filed on Nov. 11, 2016.

(51) Int. Cl.
H04L 67/14 (2022.01)
H04W 76/12 (2018.01)
(Continued)

(52) U.S. Cl.
CPC .......... *H04L 67/14* (2013.01); *H04L 12/4633* (2013.01); *H04L 61/5007* (2022.05);
(Continued)

(58) Field of Classification Search
CPC . H04L 67/14; H04L 12/4633; H04L 61/2007; H04L 63/0485; H04L 67/12;
(Continued)

(56) References Cited

U.S. PATENT DOCUMENTS

2006/0018275 A1* 1/2006 Park .................. H04W 76/19
370/328
2011/0216743 A1* 9/2011 Bachmann ............ H04L 63/164
370/331
(Continued)

OTHER PUBLICATIONS

Ericsson, "non-3GPP user plane", 1-40 3GPP Draft; S2-166398-NON3GPP User Plane, 3rd Generation Partnership Project (3GPP), Mobile Competence Centre , 650, Route Des Lucio Les , F-06921 Sophia-Antipolis Cedex; France (Year: 2016).*
(Continued)

*Primary Examiner* — Daniel B Potratz
*Assistant Examiner* — Wansik You
(74) *Attorney, Agent, or Firm* — Ericsson Inc.

(57) ABSTRACT

Systems and methods relating to establishment of a Packet Data Unit, PDU, session over a Non 3GPP Access to a 3GPP network and transmitting IP data and non-IP data are provided. A method of operation of a wireless device is provided and comprises sending to an AMF over an N3IWF a PDU session request to establish a PDU session to transport one of IP data or non-IP data over an established first IPsec, Security Association, SA, establishing an IPSec Child SA, for the PDU session and associating the IPSec Child SA to a PDU session then encapsulating the data using ESP encapsulation or GRE encapsulation associated with the IPSec Child SA and indicating the type of data that is being
(Continued)

transmitted (e.g., non-IP data that comprises raw application data). In this manner, an IoT device is able to securely transmit to the 3GPP network IP data/non-IP data/raw application data over an unsecure non 3GPP access network such as Wireless Local Area Network. Methods and apparatus describing the NAS signalling and the PDU session as each using their respective IPSec SA are provided. Similarly, methods and apparatus describing the NAS signalling and the PDU sessions sharing a common IPSec SA are provided. GRE encapsulation of the data within the ESP frame is described for both NAS signalling and PDU session in the case of multiple IPSec/Child SAs or common IPSec SA. Similarly, methods and apparatus are provided for the N3IWF which provides for the UE secure access to the network.

25 Claims, 10 Drawing Sheets

(51) Int. Cl.
*H04L 12/46* (2006.01)
*H04L 9/40* (2022.01)
*H04W 12/033* (2021.01)
*H04W 12/069* (2021.01)
*H04W 12/0431* (2021.01)
*H04L 61/5007* (2022.01)
*H04L 67/12* (2022.01)

(52) U.S. Cl.
CPC ....... *H04L 63/0485* (2013.01); *H04W 12/033* (2021.01); *H04W 12/0431* (2021.01); *H04W 12/069* (2021.01); *H04W 76/12* (2018.02); *H04L 67/12* (2013.01)

(58) Field of Classification Search
CPC . H04L 63/0272; H04L 63/0428; H04L 63/08; H04W 12/033; H04W 12/069; H04W 12/0431; H04W 76/12; H04W 12/06
See application file for complete search history.

(56) References Cited

U.S. PATENT DOCUMENTS

2015/0207779 A1* 7/2015 Hsu ................ H04L 63/029 726/4
2018/0103495 A1* 4/2018 Kim ................ H04W 76/12

OTHER PUBLICATIONS

Ericsson: "non-3GPP user plane", 1-40 3GPP Draft; S2-166398-NON3GPP User Plane, 3rd Generation Partnership Project (3GPP), Mobile Competence Centre , 650, Route Des Lucio Les , F-06921 Sophia-Antipolis Cedex; France.
Nokia et al: "Untrusted access to NGC: update to solution 8.6 and Interim agreement", 3GPP Draft; S2-166282 WAS S2-166251 WAS S2-166128-5G-Untrusted, 3rd Generation Partnership Project (3GPP), Mobile Competence Centre; 650, Route Des Lucioles ; F-6921 Sophia-Antipolis Cedex; France.
International Search Report for PCT/IB2017/057021.

* cited by examiner

USER PLANE MODEL FOR NON-3GPP ACCESS TO FIFTH GENERATION CORE NETWORK

RELATED APPLICATION

This application claims the benefit of provisional patent application Ser. No. 62/420,843, filed Nov. 11, 2016, the disclosure of which are hereby incorporated herein by reference in its entirety.

TECHNICAL FIELD

This disclosure relates generally to transport of user plane traffic over non-3GPP access networks (e.g., Wireless Local area networks, WLAN), more specifically transport of user plane traffic over untrusted non-3GPP access.

BACKGROUND

Next Generation Core Network, NGCN or 5GCN

Third Generation partnership project, 3GPP, has finalized a Study on a new core network architecture for Next Generation System (3GPP Technical Report, TR 23.799). Currently 3GPP is finalizing the corresponding normative specifications in 3GPP Technical specification, TS 23.501 and 3GPP TS 23.502. The new core network architecture, also referred to as Next Generation Core network, NGCN or Fifth Generation Core Network, 5GCN, can be based on an evolution of the current Evolved Packet Core network, EPC, or based on a "clean slate" approach. 5GCN will be used henceforth to refer to the new core architecture. 5GCN must support various access networks including but not limited to:

- the new radio access network, New RAN (also known as G-UTRAN or NextGen RAN or NG RAN), that supports the Evolved Long Term Evolution, eLTE eNBs and/or the new radio access network technology, NR (also known as G-UTRA) base stations, BS, also referred to as 5G NodeB, 5G NB, or gNB, and/or,
- other non-3GPP access network such as Wireless Local Area Network, WLAN.

FIG. 1 (prior art) illustrates one example of an 5GCN functional architecture currently in discussion in 3GPP that supports non-3GPP access network. Principles of the 5GCN functional architecture include but not limited to:

Separation of control and user plane functions.

common Core network, CN, design: which consist of defining unified authentication framework, NAS protocol which can be used over any access type and a common (R)AN-5GCN interface for all the access network types. This CN support functionality which is common to all the accesses. Thus, NG1, NG2 and NG3 interfaces of FIG. 1 should be common to the 3GPP (NR, eLTE) as well as to non-3GPP accesses (e.g., WiFi).

Single termination point for NG1 interface (See FIG. 1) in the 5GCN, for a given access: This also allows a single security association between the UE and the 5GCN for a given access.

Standalone Authentication function, AU: For supporting unified authentication framework and for supporting UEs which may support only a subset of 5G functionality (e.g. not supporting Mobility Management, MM, functionality). Therefore, the Authentication function is made separate from the MM function.

Standalone Application Function, AF: The Application Function could belong to 3rd party and hence part of different administrative domain compared to 5GCN. Hence it should be defined as standalone Network Function, NF.

FIG. 1 (prior art) introduces a Non-3GPP Packet Data Gateway, NGpdg, as an evolution of the ePDG in the EPC described in 3GPP TS 23.402. NgPDG has later been renamed Non-3GPP Interworking Function, N3IWF in the normative documents 3GPP TS 23.501 and 3GPP TS 23.502. The NgPDG is referred to as N3IWF henceforth and supports:

a control plane, CP, component for the establishment of a secure tunnel between the UE and the N3IWF (e.g. via Internet Key Exchange version 2, IKEv2, defined by the Internet Engineering Task Force, IETF, RFC 5996), interfaced to the 5GCN CP functions in the 5GCN using NG2 interface. The N3IWF uses a set of NG2 capabilities to support the EAP authentication and the NG1 Non Access Stratum, NAS, signalling between the UE and the 5GCN CP functions, mainly the Access and Mobility Management function, AMF.

a user plane component, implementing the termination of an Internet Protocol Security, IPSec, secure tunnel between the UE and the N3IWF to provide secure access to the 5GCN over the untrusted non-3GPP access to the UE. The N3IWF interfaces with the u-plane functions, UPF, in the CN over NG3 interface.

the interface between the UE and the 5GCN CP functions is NG1. NG1 is transported transparently between the UE and the AMF in 5GCN, using IP transport between the UE and the N3IWF, and NG2 between the N3IWF and the AMF.

After obtaining IP connectivity over the untrusted non-3GPP access, the UE discovers the N3IWF with a mechanism similar to the ePDG discovery in the EPC described in 3GPP TS 23.402. The UE performs an attach to the 5GCN in two steps:

The UE obtains an IP address from the Non-3GPP access.

The UE establishes an IPSec tunnel with the N3IWF over NGu possibly using the same procedure specified in 3GPP 23.402 between the UE and the ePDG. As part of establishing the IPSec tunnel, the N3IWF interacts with the CN CP functions to authenticate the UE. Extended Authentication Protocol, EAP, signalling is transported between the N3IWF and the CN CP functions via NG2 interface. The IPSec tunnel established at this step is needed to protect subsequent NG1 signalling between the UE and the CN CP functions and transported between the UE and the N3IWF.

Once the tunnel is established, and the UE is therefore authenticated, the UE sends NAS signalling containing a NAS Attach Request encapsulated in the IPSec tunnel to the N3IWF. The N3IWF extracts the NAS signalling and sends it to the AMF The network, upon receiving the NAS attach request from the UE, verifies that the UE is already authenticated and processes the attach procedure without re-authenticating the UE.

The attach procedure is separate from the Packet Data Unit, PDU, session establishment procedure. The UE exchanges explicit Session Management signalling for the establishment of PDU Sessions for Internet Protocol, IP, type of traffic over the IPSec tunnel established with the N3IWF. The N3IWF extracts the NAS signalling and routes it over NG2 between the N3IWF and the AMF. A PDU session for transporting the IP traffic is thus established.

To support non-3GPP access, the following reference points illustrated in FIG. 1 (prior art) are used:

Y1: Reference point between the UE and the non-3GPP access (e.g. Wireless Fidelity, WiFi).

Y2: Reference point between the untrusted non-3GPP access and the N3IWF for the transport of traffic and signalling between the UE and the 5GCN.

NGu: NGu represents interface between the UE and the N3IWF for establishing a secure tunnel between the UE and the 5GCN, similar to the interface between the UE and the ePDG, and for securing the control plane and user plane exchanged between the UE and the 5GCN.

NG2: NG2 represents the interface between the N3IWF and the CP functions (AMF). In the case of N3IWF, the NG2 functions used include: transporting signalling between the UE and the CP Functions for UE authentication (NG1 NAS signalling), enabling the CP functions to configure the N3IWF (e.g. at PDU session establishment).

NG3: represents the user plane interface between the N3IWF and the UP functions.

SUMMARY

As 5GCN must support IP traffic and non-IP traffic, systems and methods are disclosed for transporting non-IP traffic as well as IP traffic over the IPsec tunnels between the UE and the N3IWF. Non-IP traffic can be used in Internet of Things, IoT, scenarios where IoT devices (e.g., sensors) are connected to the 5GCN and may use the UE as a relay, relaying non-IP traffic from the IoT devices to the 5GCN. The IoT devices may be low power, simple devices that do not support complex protocol stacks and complex processing required by encryption/decryption algorithms. Other scenarios where the IoT devices may be connected directly to the N3IWF over an Internet Protocol Security tunnel and they are designed to send raw data (non-IP traffic) are covered by the embodiments described herein.

In this disclosure, systems and methods are disclosed for supporting establishment of Packet data unit, PDU session to transport non-IP data which comprise raw non-IP data such as raw application data, between a wireless device or UE and a core network (5GCN) over a non 3GPP access such as wireless Local Area network, WLAN that is not trusted. The UE and the 5GCN are connected over a first Internet Protocol Security Security Association, IPSec SA established between the UE and an N3IWF in 5GCN at the time of UE access and registration to 5GCN. The data that is transported for the PDU session may be non-IP data (e.g., Ethernet traffic), raw non-IP data such as raw application data or even IP data. Raw non-IP data is considered a subset of a non-IP data. The data can be transported over the PDU session over:

1) the same IPSec SA that transport the Non Access Stratum, NAS, messages and used for the PDU establishment procedure. The IPSec SA is established at UE registration/attach. The data is further encapsulated in another tunnelling protocol such as Generic Routing Encapsulation, GRE or the likes. GRE may identify the type of data (i.e., IP data from non-IP data). Embodiments are provided to describe how non-IP data that comprise raw non-IP data is transported over IPSec, or, 2) a separate IPSec Child SA established for the PDU session, while NAS is transported over the (first) IPSec SA established at registration/attach. The data transported over the PDU session may be further encapsulated in a GRE or the like, in which case the type of data is identified in the GRE header instead of the next header of the ESP trailer. NAS signalling is transported over its own IPSec SA, which is generally the first IPSec SA, and may be transported within an ESP and identified in the next header of ESP trailer or it may also be encapsulated within GRE before being transported in ESP. Note that small data units may be transported over NAS, in which case NAS messages transporting data may be separately identified in Encapsulated Security payload, ESP, associated with the first IPSec SA. Note that when GRE is used to encapsulate the data of a PDU session and optionally the NAS signalling, ESP of the IPSec SA or the Child SA can be used in transport mode instead of tunnelled mode.

In an aspect, the wireless device or UE sends a Non Access Stratum, NAS, Packet Data Unit, PDU session request over an established IPSec to establish a PDU session of a particular type, i.e., for transporting Non-IP or IP data, where Non-IP data comprises also raw application data or Ethernet frames. The IPSec SA was previously established at UE access or registration. As a result of the PDU session request, the UE or the network initiates establishment of an IPSec Child SA for the PDU session. The UE then associates the IPSec Child SA to the PDU session. When the UE has data to send, it sends it in ESP frame which is also referred to an ESP encapsulation. It may first encapsulate the data using an inner (or first) encapsulation and transmits the encapsulated data in an ESP frame corresponding to the established Child IPSec SA. The NAS signaling is however transported over the previously established IPSec SA and may be transported natively in ESP or encapsulated in GRE or other similar encapsulation method, prior to being transmitted to the network in an ESP frame.

In one aspect, the PDU session request includes an application type or an application identifier of an application generating the data for the PDU session. This may support the 5GCN to further identify the destination for the data.

In one aspect, establishing the IPSec Child SA further comprises receiving an Internet Key Exchange, IKE Create_Child SA request message of an IKE Child SA exchange over the established first IPSec SA. In another aspect, establishing the IPSec Child SA further comprises sending an IKE Create_Child SA request message of the IKE Child SA exchange over the established first IPSec SA.

An aspect for the UE is provided for obtaining an Internet Protocol, IP, address assigned to the PDU session during the IKE Child SA exchange in addition to receiving the IP address in the PDU session response. This is used by the UE to associate the IPSec Child SA to the PDU session by correlating the IP address obtained in the IKE Child SA exchange to the IP address assigned to the PDU session.

In another aspect, the PDU session response comprise the security parameter Index, SPI, of the IPSec Child SA which may be used by the UE to associate the IPSec Child SA to the PDU session by correlating the SPI received in the IKE Child SA exchange to the SPI received in the PDU session response.

In one aspect, sending the PDU session is initiated by the UE as a result of receiving the non-IP data or raw non-IP data from an Internet of Thing, IoT, device connected to the UE, hence using the UE as a relay device or a router device.

According to one aspect, the wireless device or UE comprises at least one transceiver, at least one processor; and memory comprising instructions executable by the at least one processor whereby the wireless device (100) is operable to perform any of the embodiments described herein.

According to another aspect, the wireless device or UE comprises one or more modules configured to perform the embodiments herein.

According to another aspect, the wireless device or UE is adapted to send a Non Access Stratum, NAS, Packet Data Unit, PDU session request over an established IPSec (established at UE registration) to establish a PDU session for non-IP data or IP data. The UE then receives a PDU session response in response to the PDU session request. When UE has data to send, it encapsulates the non-IP data or IP data using an inner (or first) encapsulation and transmitting the encapsulated non-IP data as an encapsulated security payload, ESP frame corresponding to the established IPSec SA.

In one aspect, the inner encapsulation is a Generic Routing Encapsulation, GRE. In another aspect, the ESP is applied to both NAS messages and GRE encapsulated non-IP or IP data and where the Next Header field of the ESP identifies the encapsulated payload as NAS or GRE.

In one aspect, the inner encapsulation is a Generic Routing Encapsulation, GRE and ESP is applied to both GRE encapsulated NAS messages and GRE encapsulated non-IP or IP data and where the protocol type field of the GRE identifies the encapsulated payload as NAS, IP data or non-IP data (raw or framed).

In one aspect, a network entity is provided that comprises at least one processor; and memory comprising instructions executable by the at least one processor whereby the network entity is operable to receive a NAS PDU session request over an established IPSec to establish a PDU session for transporting data (Non-IP or IP data) where Non-IP data comprises also raw application data or Ethernet frames where the Ethernet frame may contain IP data. The IPSec SA was previously established at UE access or registration. As a result of the PDU session request and interaction with the other CN CP functions, the network entity (or the UE) initiates establishment of an IPSec Child SA for the PDU session. The network entity associates the IPSec Child SA to the PDU session. When the network entity (N3IWF) has data to send to the UE, it may encapsulate the data using an inner (or first) encapsulation such as GRE or the likes and transmitting to the UE the encapsulated data as an encapsulated security payload, ESP, corresponding to the established Child IPSec SA. If inner encapsulation is not used, it transmits the data to the UE n an ESP frame (ESP encapsulation) corresponding to the established Child IPSec SA. The NAS signaling is however transported over the previously established IPSec SA and may be transported natively in ESP or encapsulated in GRE or similar prior to being transmitted in an ESP.

In another aspect, the network entity maps the IPSec Child SA to the PDU session based on mapping the PDU session to a security parameter index, SPI, of the IPSec Child SA. In another aspect, the network entity is further use the IP address assigned to the PDU session to map the PDU session to the IPSec Child SA.

In accordance with another aspect, the network entity comprises one or more modules to perform the embodiments of the network entity, N3IWF, herein.

In another aspect, the network entity (N3IWF) is adapted to receive a NAS PDU session request over an established IPsec SA to establish a PDU session for the UE in order to transport non-IP data, and where the NAS PDU session request is encapsulated in an Encapsulated Security Payload, ESP. The network entity forwards the NAS PDU session request to a control entity in the network (e.g., AMF). It receives a PDU session response from the control entity. The network entity sends the PDU session response to the UE and indicates the data of the PDU session is to be encapsulated by an inner encapsulation in the ESP. The network node applies inner encapsulation to the non-IP data and transmit to the UE (100) the encapsulated non-IP data in an ESP frame associated with the common IPSec SA. The IPSec SA is common as it is shared between NAS signalling and PDU session data.

In one aspect, the additional encapsulation is a Generic Routing Encapsulation, GRE. In another aspect, GRE is applied to both NAS signalling and PDU session data and in another aspect GRE is applied only to the PDU session data.

BRIEF DESCRIPTION OF THE DRAWINGS

The accompanying drawing figures incorporated in and forming a part of this specification illustrate several aspects of the disclosure, and together with the description serves to explain the principles of the disclosure.

DETAILED DESCRIPTION

Figure 1:
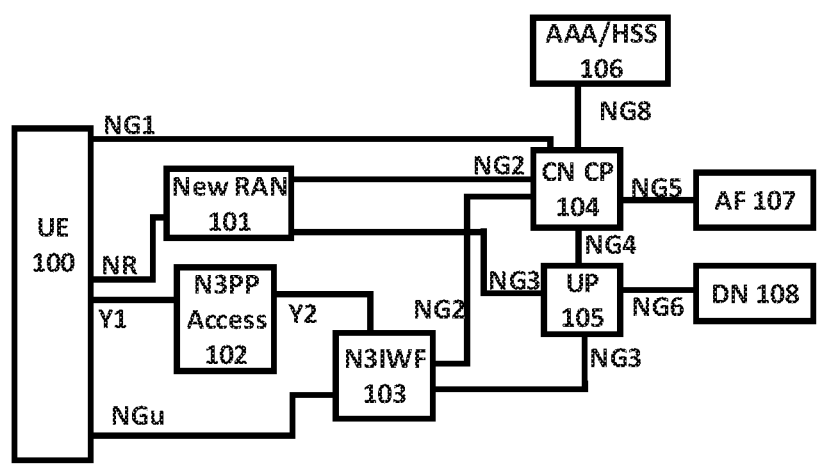
FIG. 1 (prior art) illustrates one example of an 5GCN functional architecture supporting non 3GPP access as well as the new RAN (5G) currently in discussion in 3GPP.

The embodiments set forth below represent information to enable those skilled in the art to practice the embodiments and illustrate the best mode of practicing the embodiments. Upon reading the following description in light of the accompanying drawing figures, those skilled in the art will understand the concepts of the disclosure and will recognize applications of these concepts not particularly addressed herein. It should be understood that the concepts herein and applications fall within the scope of the disclosure.

In the present disclosure, a UE, which is a non-limiting term refers to any type of wireless device communicating over a wireless radio interface with a radio access node such as eLTE eNB, LTE eNB, 5G/NR gNB Access point, AP, and over a network interface (e.g., non-access stratum, NAS, or NG1) with network nodes such as 5GCN CP entities such as MM entity and SM entity in 5GCN. The UE may also communicate with another UE in a cellular or mobile communication system and may communicate with one or more Internet of Things, IoT, devices which use the UE as a relay or gateway to the 5GCN. Examples of a UE are a Personal Digital Assistant (PDA), a tablet, mobile terminals, a smart phone, Laptop Embedded Equipment (LEE), Laptop Mounted Equipment (LME), Universal Serial Bus (USB) dongles, etc. In an IoT scenario, a UE may represent a machine or other device that performs monitoring and/or measurements, and transmits the results of such monitoring and/or measurements to another UE and/or a network node. The UE may in this case be a machine-to-machine, M2M, device, which may in a 3GPP context be referred to as a machine-type communication (MTC) device. As one particular example, the UE may be a UE implementing the 3GPP narrow band internet of things, NB-IoT, standard (Cellular IoT, CIoT), Wireless Fidelity, WiFi™ standard, Bluetooth, or other. Particular examples of such machines or devices are sensors, metering devices such as power meters, industrial machinery, or home or personal appliances (e.g. refrigerators, televisions, etc.) personal wearables (e.g., watches, fitness trackers, etc.). In other scenarios, a UE may represent a vehicle or other equipment that is capable of monitoring and/or reporting on its operational status or other functions associated with its operation. A UE as described above may represent the endpoint of a wireless connection, in which case the device may be referred to as a wireless terminal. Furthermore, a UE as described above may be mobile, in which case it may also be referred to as a mobile device or a mobile terminal. A wired device is similar to a wireless device except it communicates with network nodes over wired interface instead of a radio technology.

In the present disclosure, a PDU Session corresponds to an association between the UE and a data network, DN, that provides a PDU connectivity service. The PDU session as presented herein can be of IP type to carry IP type traffic, Ethernet type to carry Ethernet type traffic and non-IP data type to carry raw application data or raw non-IP data. Note that Ethernet type could be a subset of non-IP data type traffic.

Description of Scenario for Establishing a PDU Session for IP and Non-IP Traffic Following a Successful Attach.

Figure 2:
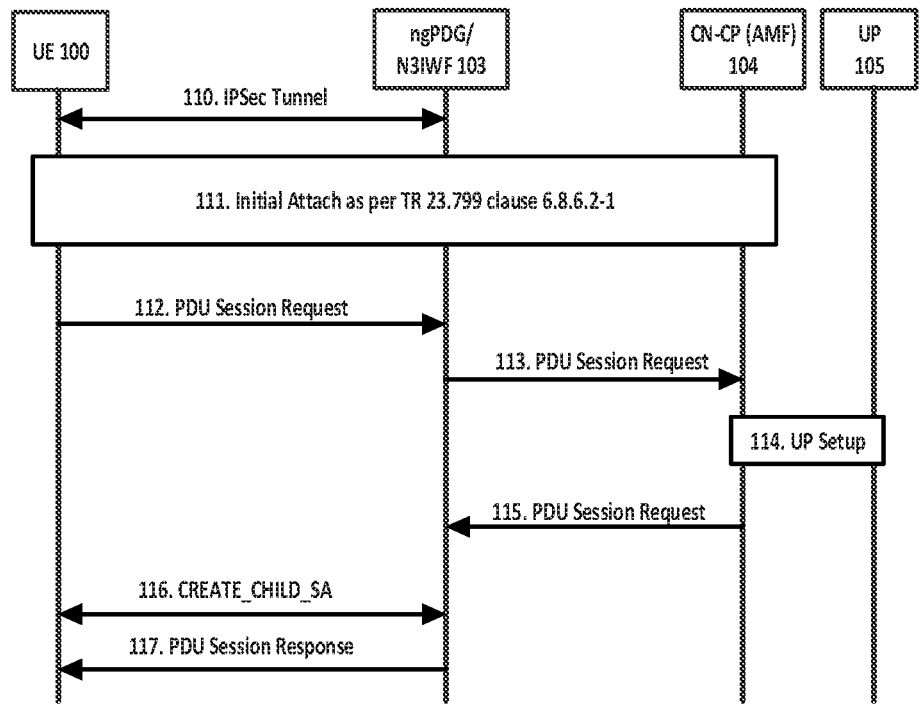
FIG. 2 illustrates a flow diagram for establishment of a PDU session and a corresponding child Security Association, SA, according to one embodiment.

FIG. 2 illustrates a flow diagram for a Packet Data Unit, PDU, session establishment between a UE 100 and the 5GCN over a non-3GPP access and over an established IPsec tunnel with the N3IWF 103. At step 110, the UE 100 exchanges Extended Authentication Protocol, EAP, messages over Internet Key Exchange, IKE, version 2 with N3IWF 103, which leads to the establishment of the first Internet Protocol Security Security Association, IPsec SA. It will be appreciated that the IKE establishment procedure and exchange of EAP messages for establishing the first IPSec SA comprises additional signalling and operations which have not been shown in the figure in order not to obscure the figure. In that sense, more details about the EAP procedure and its related signalling and operations can be found, for instance, in 3GPP TR 23.799 V. 1.1.0 clause 6.8.6.2.1.

The first IPsec SA established at step 110 may be exclusively used for NAS signalling. The UE 100 may use a special value in the Security parameter index, SPI, to indicate that the tunnelled data corresponds to NAS signalling. At step 111, the UE 100 performs an initial attach procedure as described in 3GPP TR 23.799 clause 6.8.6.2.1 or 3GPP TS 23.502, clause 4.2.2.2 over the established IPSec SA. Alternatively, the attach procedure may be performed in parallel with step 110. The attach procedure (between the UE 100 and the CN-CP entity 104) is performed through the N3IWF 103.

At step 112, the UE 100 determines that a PDU session for either IP traffic or non-IP traffic should be established with 5GCN and sends a PDU session request message to N3IWF 103 as a NAS message encrypted or ESP encapsulated over the established first IPsec SA. The NAS message may also use UDP/IP before being ESP encapsulated. The UE 100 may send the PDU Session request message to the control plane N3IWF which addressing information is obtained during the attach procedure. The PDU session request message includes the protocol type to indicate the type of traffic for the PDU (i.e., IP data or non-IP data). If the PDU session request indicates non-IP data traffic, the request may further indicate the application type/identifier associated with the non-IP data in which case, the 5GCN through maintaining a table comprising a mapping between the identity of the UE 100 (e.g., IP address, International Mobile station identity and the like), the type of application associated with the data and/or the intended destination for the traffic, would be able to route the traffic accordingly. Alternatively, the PDU session request may indicate the type of data as raw non-IP data, such as for example Ethernet type traffic or other.

At step 113, the N3IWF 103 decapsulates the received NAS PDU session request message and forwards it to the Serving CN CP function/AMF 104 via the NG2 interface. The N3IWF 103 may not require to process or be aware of the content of the NAS PDU session request message. The N3IWF 103 may also include at this time an IP address for a tunnel termination point towards the User Plane, UP, function 105 in 5GCN which would be used for the establishment of the user plane between the N3IWF 103 and the UP function 105 for the requested PDU Session. Note that, if at completion of the PDU session establishment procedure, the N3IWF 103 has not receive from the Serving CN CP Function/AMF 104 the user plane information for the UP functions 105, the N3IWF 103 would release the allocated IP address for the tunnel.

At step 114, The CN CP function/AMF 104 in coordination with a session management entity (not shown for simplicity) performs the UP setup (including UP function selection) with the UP function 105, including assigning the UE IP address(es) for the PDU session. The CN CP function/AMF 104 forwards to the UP function 105 the IP address for the tunnel termination point at the N3IWF 103, and obtains from the UP function 105 the tunnel termination address on the UP function 105. In one aspect, if the PDU session is for raw non-IP data, the CN CP function/AMF 104 may provide to the UP function 105, the raw non-IP data type or the application type as provided by the UE 100 in the NAS PDU session request.

At step 115, the Serving CN CP function/AMF 104 sends a PDU session response message to the N3IWF 103 over NG2 interface and provides to the N3IWF 103 the PDU session related information (including IP address(es) assigned to the UE 100, QoS rules, the UP function tunnel termination address, etc.). If the protocol type in the PDU session request indicates raw non-IP data and if the application type/identifier is included in the PDU session request, the CN CP function/AMF 104 may further query a database to request the IP address of the application server associated with the application in the UE 100. The IP address of the application server may be provided to either the UP function 105 or to the N3IWF 103 as part of the session parameters.

At step 116, and based on the received PDU session related information, the N3IWF 103 triggers an IKE CREATE_CHILD_SA exchange with the UE 100 to create an IPSec Child SA for the PDU session. The IKE CREATE_CHILD_SA exchange comprises a pair of Request-Response messages and is cryptographically protected using the cryptographic algorithms and keys negotiated in the initial IKE exchange carried out at establishment of the first Child SA at step 110 of FIG. 2. The N3IWF 103 may include in the IKE CREATE_CHILD_SA request the assigned IP address(es) for the UE 100 or an identifier for the PDU session in a CFG_REPLY Configuration Payload (CP).

Once the IPSec Child SA is created, the N3IWF 103 sends at step 117 the PDU session response message over UDP/IP and encapsulated in an IPSec packet to the UE 100. The PDU session response is sent over the IPSec tunnel for the NAS, i.e., the first SA established at step 110. Alternatively, it may send the PDU session response over the established IPSec tunnel of the child SA. The N3IWF 103 may also include the SPI of the established IPsec Child SA in the PDU session response to the UE 100 to enable the UE 100 to correlate the PDU session response with the established child SA. Alternatively, if the N3IWF 103 included the assigned IP address for the UE in IKE_CREATE_CHILD SA request, the UE 100 would be able to correlate the PDU session response received over the IPSec tunnel for NAS and the child SA established for the PDU session.

The N3IWF 103 associates the IP address(es) allocated for the PDU session with the child SA (e.g., SPI of the child SA). Likewise, the UE 100 may associate the IP address(es) allocated for the PDU session with the child SA (e.g., SPI). The UE 100 would be able to associate the Child SA with the requested PDU session by either correlating the UE IP addresse(s) received in the IKE CREATE_SA request and the PDU session response or correlating the SPI of the child SA with the SPI that may be included in the PDU session response. The UE 100 may also use the application type in the association of the Child SA with the requested PDU session. Alternatively, the UE 100 may use other means to associate the IP address(es) allocated for the PDU session with the child SA established for the PDU session.

As illustrated in the embodiment of FIG. 2, the first IPSec SA can be used to transport NG1 messages and a second Child SA should be established to dedicatedly transport user plane data for the PDU session. So, N3IWF 103 and UE 100 can distinguish NG1 messages from user plane data based on the SPI value of IPSec tunnel. NAS or NG1 messages may be transported natively as ESP packets or encapsulated in GRE as illustrated in FIG. 3d (or similar encapsulation) before being transmitted in ESP associated to the first IPSec SA. Either ESP next header or field in GRE is used to identify the transported traffic as NAS signalling. User plane data may be sent natively in ESP or encapsulated in GRE (or similar encapsulation) before being transmitted in ESP associated to the IPSec Child SA. Either ESP next header field or a field in GRE is used to identify the transported user plane traffic. The user plane traffic can be identified as IP-traffic, non-IP (raw non-IP data or framed data such as Ethernet) as NAS signalling. For IoT devices, NAS can also be used to transport user data, which may be IP data or Non-IP data (without the need to establish a PDU session) in which case the N3IWF may make a determination if the received data over NAS should be sent to the CN-CP function 104 or to the UP function 105.

In another embodiment, for uplink IPSec packet, a special destination IP address or Port number can be used by N3IWF 103 to distinguish NG1 messages from user plane data. For downlink IPSec packet, the special IP address and Port number should be marked as the source IP address and Port number and used by the UE 100 to distinguish NG1 messages from user plane data.

In another embodiment, if only one IPSec SA is allowed per UE, an inner protocol identifier may be added to distinguish NG1 messages from user plane data (therefore adding an extra identification layer).

In another embodiment, NAS messages transported over the first IPSec SA and the DPU data transported over the Child In accordance with FIG. 2, PDU Sessions will be created individually, with each PDU Session supporting a specific protocol type, such that IP traffic and non-IP traffic will be unique within the PDU session. Therefore, the protocol type will be evident from the PDU Session context stored in the 5GCN. Together with creating a new PDU session there will be a new child SA assigned to the IP Sec tunnelling between the UE 100 and the N3IWF 103 to support the specific PDU Session.

As indicated, the SPI value of the IPSec tunnel created by child SA individually for each PDU session in the N3IWF, is used to distinguish NAS signalling and each PDU session from each other. For non-IP sessions, the Next Header field in the IP header could be set to any value, or obtained from the Internet Assigned Numbers Authority, IANA. For IP connections proto=IP is used. Both for IP and non-IP connections, the N3IWF only do relaying between IPsec and tunnelling layer towards the CN CP and UP functions.
Description of Protocol Stack Examples of UP for Transporting IP and More Specifically Non-IP Traffic Over N3PP Access and Description of an ESP Frame Example Carrying Non-IP Traffic.

Figure 3A:
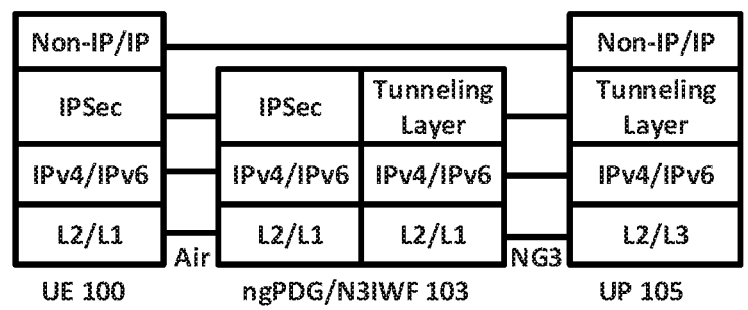
FIG. 3a illustrates a protocol stack of the user plane over non 3GPP access according to one embodiment.

FIG. 3a illustrates the protocol stacks in the UE 100, N3IWF 103 and UP function 105 when IP traffic or raw non-IP traffic is carried over an established IPsec tunnel established for the PDU session according to an embodiment. In FIG. 3a, the IP traffic or non-IP data traffic is encapsulated in an IPSec tunnel corresponding to the child SA between the UE 100 and the N3IWF 103. Non-IP data traffic is encapsulated as raw data within an IPSec ESP header and the next header indicates raw non-IP data. The N3IWF 103 de-capsulates the raw non-IP data, and tunnels the raw non-IP data to the UP function 105.

If at step 115 of FIG. 2, the N3IWF 103 received the IP address of the application server associated with the raw non-IP data, it may encapsulate the raw non-IP data in an IP header that contains the application server IP address as destination address and the UE IP address included as the originating IP address. The N3IWF 103 then tunnels the encapsulated raw non-IP data to the UP function 105.

Figure 3B:
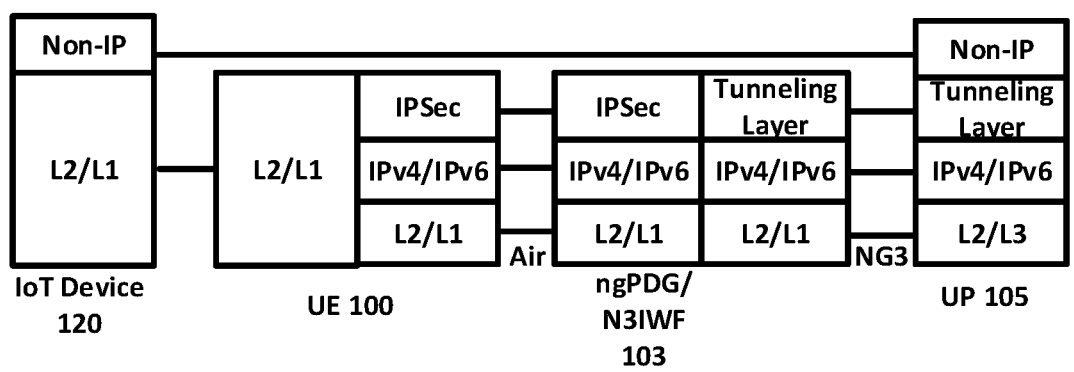
FIG. 3b illustrates a protocol stack of the user plane over non 3GPP access for non-IP traffic encompassing an IoT device connected to the UE according to one embodiment.

FIG. 3b illustrates the protocol stacks according to another embodiment in the UE 100, N3IWF 103 and UP function 105, where the raw non-IP data originates from an IoT device 120 connected to the UE 100, using the UE 100 as a relay relaying the raw Non-IP data over the child SA. In FIG. 3b, the IoT device 120 sends raw non-IP data to the UE 100, the UE 100 through the stored association (UE IP address, Child SA (e.g., SPI), and optionally the application type/identifier) sends the raw non-IP data over the established child SA for that IoT device (may be based on application type/identifier). The UE 100 encapsulates the raw non-IP data in an ESP header and tunnels it to the N3IWF 103. The next header is used to indicate that raw non-IP traffic or non-IP data is included. Similar to the illustration of FIG. 3*a*, the N3IWF 103 decapsulates the raw non-IP data and tunnels the raw non-IP data to the UP function 105. If at step 115 of FIG. 2, the N3IWF 103 received the IP address of the application server associated with the raw non-IP data, it may encapsulate the raw non-IP data in an IP header containing the application server IP address as the destination address in the IP header and UE IP address as originating IP address of the IP header prior to tunnelling the encapsulated raw non-IP data to the UP function 105.

Figure 3C:
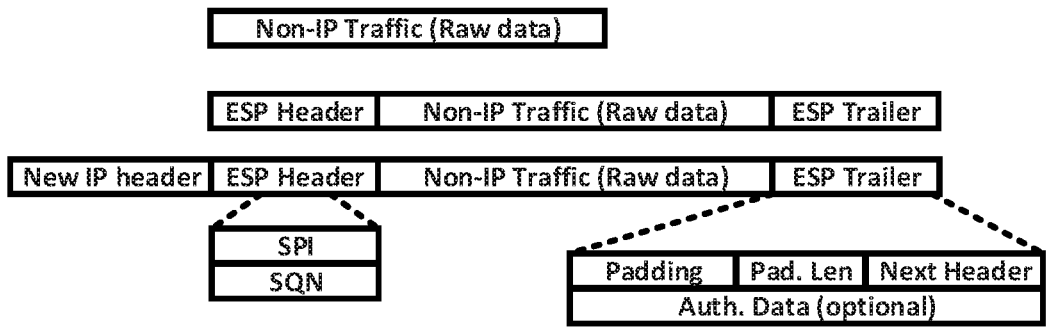
FIG. 3c illustrates an ESP frame transporting raw non-IP traffic according to one embodiment.
Figure 3D:
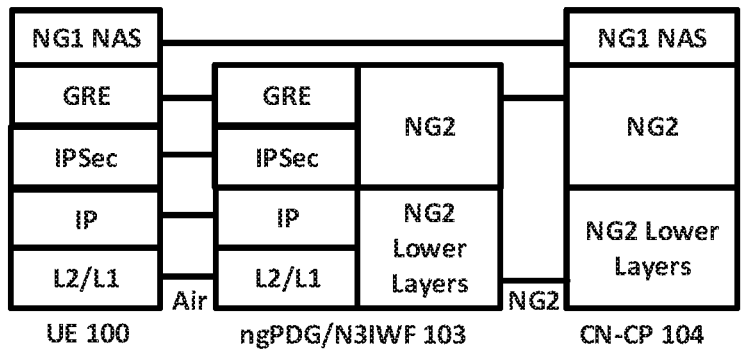
FIG. 3d illustrates a protocol stack for the control plane from the UE to CN CP in 5GCN according to one embodiment.

FIG. 3*c* illustrates the frame format of the ESP tunnel carrying raw non-IP data according to an embodiment. The frame format is identical to well-known ESP tunnel format that is typically used to transport IP payload. However, when the ESP tunnel encapsulates raw non-IP data, the next header will indicate that raw non-IP data is transported after the ESP header. The next header therefore may indicate raw non-IP data or IP data.

Proposed Principles of Non-IP Data Packets Support in N3PP Access

After Attach or PDU session establishment is performed the N3IWF 103 will provide secure communication towards the UE 100 using IPSec tunneling. IP packets as well as Non-IP packets may be sent by the UE over IP Sec towards the 5GCN. IP packets are sent in IPSec as shown in FIG. 3*a*. It is assumed that the NG3 link and/or the NG2 link (in case of data received over NAS) will support non-IP data, but it must be considered how the IPSec tunnel between the UE 100 and the N3IWF 103 will handle these packets. Embodiments are proposed describing different alternatives:

1) non-IP packets are sent as raw payload inside a IPSec tunnel (as illustrated in FIG. 3*b*)

In case of using PDU type specific PDU Sessions with e.g. IPSec child SA created PDU sessions, there should be no problem to identify the data since it will be clear from the PDU session context which non-IP protocol is transported in the session. The Next Header field in ESP could be set to any value, or a value from the unassigned lot could be obtained from the Internet Assigned Number Authority, IANA. It will be possible to distinguish user plane sessions and NAS messages based on the SPI value of the IPSec tunnel since NAS and PDU sessions are transported over different IPSec SA. An embodiment of the user plane protocol stacks for the IP and non-IP UP transported as payload inside IPSec tunnel is shown in FIG. 3*a*.

Figure 3E:
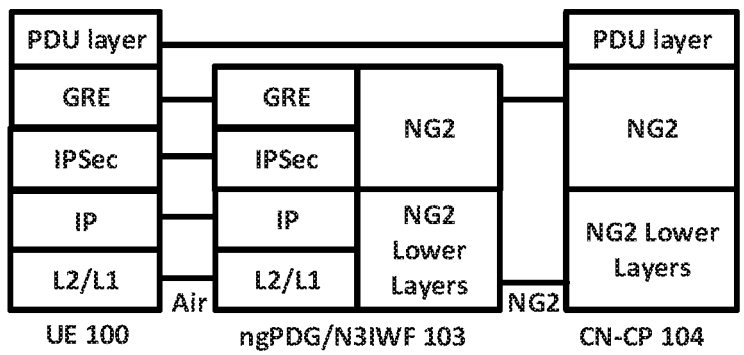
FIG. 3e illustrates a protocol stack of the user plane over non 3GPP access according to another embodiment.

2) Non-IP (and IP) packets are tunnelled in some tunnelling protocol over IP Sec, e.g. Generic Routing Encapsulation, GRE:

Within the GRE tunnel (the Protocol Type field is used to identify the payload). This field currently carries the EtherType, which may be used to indicate the non-IP data. If further indication is needed as to whether it is raw non-IP data or framed non-IP data, an additional value is used to indicate the type of non-IP data. The PDU session may use a unique IPSec child SA or share the IPSec SA of the NAS signalling. The EtherType would be used to distinguishing NAS signalling as well as PDU Sessions. The GRE based solution could apply for the case when a common IPSec SA is used between the UE and the N3IWF to carry both NAS signalling and user data of PDU sessions or when different IPSec SAs are used to carry NAS signalling and user data of PDU sessions. One Child IPSec SA can be created for each PDU session, or one or more PDU sessions may share one IPSec Child SA. The NAS signalling is transported over its own IPSec SA, which is typically the first established IPSec SA or a first IPSec child SA. NAS and user data of the PDU session is encapsulated as payload in GRE. The GRE packet is transmitted in an ESP frame providing an outer encapsulation. FIG. 3*d* illustrates an embodiment of a protocol stack for NAS signalling used to establish a PDU session where the NAS signalling is transported over GRE instead of UDP. FIG. 3*e* illustrates an embodiment of a protocol stack for user data transported over GRE.

It can be acknowledged that the introduction of the IPSec Child SA for the PDU session separate from the IPSec SA of the NAS signalling may not require the use an intermediate protocol layer such as GRE. However, use of GRE or other suitable encapsulation method provides flexibility in transmitting additional information for the PDU session, such as but not limited to:

Support transfer of Quality of Service class information

Support transfer of Reflective QoS information

Support encapsulation of all PDU types, including IPv4, IPv6, Ethernet and Unstructured PDUs without having to introduce a new value for the next header of the ESP trailer that requires IANA approval.

In another embodiment, the NG1 or NAS signalling uses another IPsec child SA of its own. The UDP layer can also be removed from the CP protocol stack and use GRE as shown in the embodiment of FIG. 3*d*. In fact, it may be advantageous to remove the UDP layer from the control plane in order to get away from IP version issues in UDP.

Description of Exemplary Methods at the UE and N3IWF for Establishing a PDU Session Over N3PP and Establishing a UP Connection.

Figure 4A:
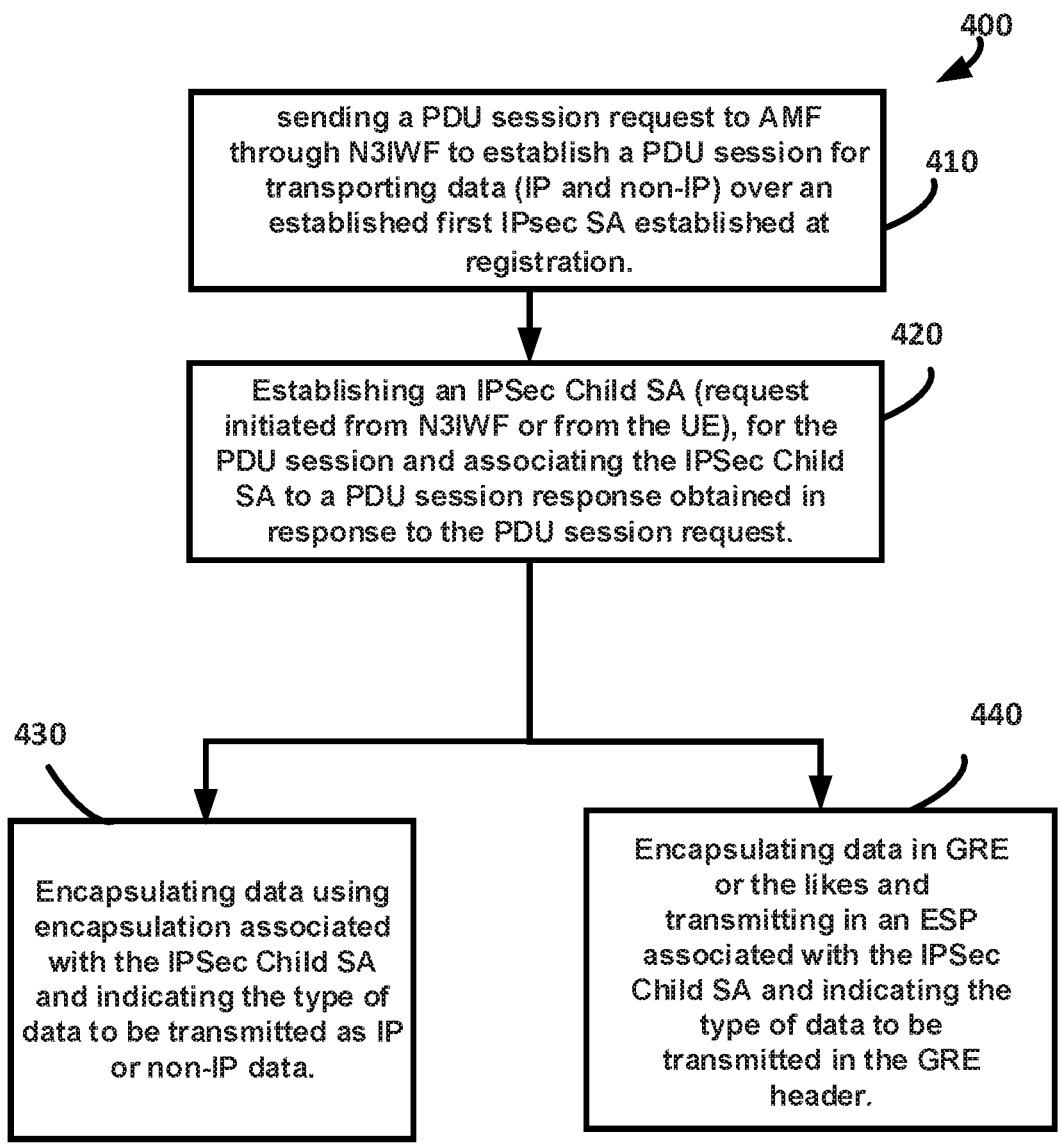
FIG. 4a illustrates an exemplary method at a UE for establishing a PDU session and transport of the PDU data according to one embodiment.

FIG. 4*a* illustrates a method 400 executed at the UE for establishing a PDU session with 5GCN. At step 410, the UE is already attached and has established a first IPSec SA. The UE then initiates a NAS PDU session request message, which may be triggered immediately following successful attach and establishment of first SA or may be initiated as soon it obtains data to send from the application to the network. The UE may obtain non-IP data which comprises raw application data from the applications within the UE or from IoT devices connected to the UE. IoT devices using non-IP data are typically low power very simple IoT devices such as sensors or the like. The PDI session may also be triggered by IP data being available for transmission. The UE triggers the PDU session request to the N3IWF over the established IPSec SA (first SA). The UE indicates in the request the protocol type is for non-IP data or IP data, it may also indicate the application type/identifier which may be known by the UE from the data received from the IoT device or from the type of IoT device connected to the UE. At step 420, the UE receives an IKE Create-Child SA request to establish a child SA for the PDU session. The IKE Create-Child SA request may include the UE IP address assigned to the UE for the PDU session. The UE establishes the child SA and completes the IKE Create Child-SA exchange with the N3IWF. The UE then receives the NAS PDU session response that comprises the assigned UE IP address for the session and may also include the SPI value of the Child IPsec SA if the PDU session response is received over the IPSec SA.

The UE may create an association comprising the UE IP address(es) assigned for the PDU session, the child SA (e.g., SPI) and optionally the application type/identifier or other identifier such as the IoT identity known by the UE to identify the IoT device application sending the data.

At steps 430, 440, the UE receives data (non-IP and IP data) to send over the established IPSec child SA. Alternatively, the UE may already have data ready to be sent, in which case the data is ready to be sent over the established IPSec child SA. When data is received from for example an IoT device connected to the UE, the UE uses the stored associations to identify the child SA over which the non-IP data should be sent. The UE encapsulates the data (non-IP data or IP data) in the ESP tunnel (430), it may apply GRE encapsulation or the like (step 440) prior to encapsulating the data in ESP frame. If GRE is used (step 440) to encapsulate the data, the PDU session request and response may include information regarding using the GRE encapsulation such as the GRE keys or any other relevant information to allow the UE to encapsulate and decapsulate the data exchanged over the GRE tunnel.

If PDU session data is encapsulated natively in ESP of the IPSec Child SA step 430, i.e., no GRE is used, the ESP payload is identified as non-IP data or IP data (more granular identification can be used, such raw non-IP data and framed non-IP data, etc) by appropriately setting the next header field in EPS. The NAS signalling transported using the first IPSec SA is identified in the next header of ESP as NAS signalling.

If PDU session data over the IPSec Child SA is encapsulated in GRE, step 440, and further encapsulated in ESP, the ESP header may simply indicate GRE. The Protocol Type field in the GRE header is used to identify the type of payload. This field currently carries the EtherType, which may be used to indicate the type of payload or data (IP data or non-IP data). If further indication is needed as to whether the non-IP data is raw non-IP data or framed non-IP data, an additional value could used to indicate the type of non-IP data. The EtherType could be used to distinguish NAS signaling when GRE is used for NAS signaling on the first IPsec SA.

At steps 430, 440, the ESP encapsulated data (with or without GRE inner encapsulation) is tunnelled to N3IWF over the child IPSec tunnel (or child SA). If GRE is not used, the UE can also distinguish NAS signalling and PDU session data using the SPI value as NAS signalling is carried over its own IPSec SA.

Figure 4B:
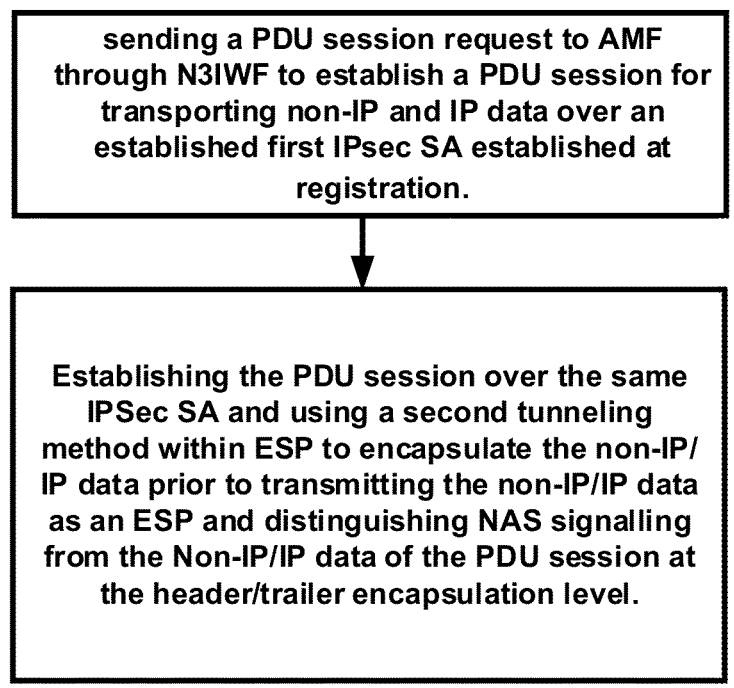
FIG. 4b illustrates an exemplary method at a UE for establishing a PDU session and transport of the PDU data according to another embodiment.

In another embodiment illustrated in FIG. 4b, the UE does not establish a child SA for the PDU session, instead, the PDU session for the non-IP data or IP data uses the same IPSec SA established during the registration or attach of the UE with the 5GCN as illustrated at step 110 of FIG. 2. Note that a PDU session for IP data and the PDU session for non-IP data may share the same IPSec SA. The same IPSec SA is also used for NAS signalling. A method would be needed to differentiate the signalling from the data and further a method to differentiate between IP data and non-IP data would be required. The next header field in the ESP trailer of the IPSec SA, indicates either NAS signalling or tunnelled data for the data associated with the PDU session, or may indicate tunnelled traffic that encompasses both NAS and data of the PDU session. The UE may receive as part of the PDU session response or in an IKEv2 message from N3IWF Information regarding an (inner) encapsulation method to be applied to the non-IP data (e.g., GRE key if GRE tunnelling is used) prior to transmitting the data over the IPSec SA. The data is thus encapsulated with an inner encapsulation before being encapsulated in an ESP which acts as an outer secure encapsulation. The UE may use GRE encapsulation or the like as the inner encapsulation to encapsulate the data (i.e., non-IP data and IP data) associated with the PDU session. The UE may also use GRE as an inner encapsulation to encapsulate NAS signalling. However, NAS signalling may also be send natively in an ESP with the ESP next header indicating "NAS. A field in the GRE header indicates the type of payload, i.e., non-IP data, IP-data or even NAS. It may even indicate raw non-IP data or raw application data to further distinguish between different types of non-IP data.

Figure 5A:
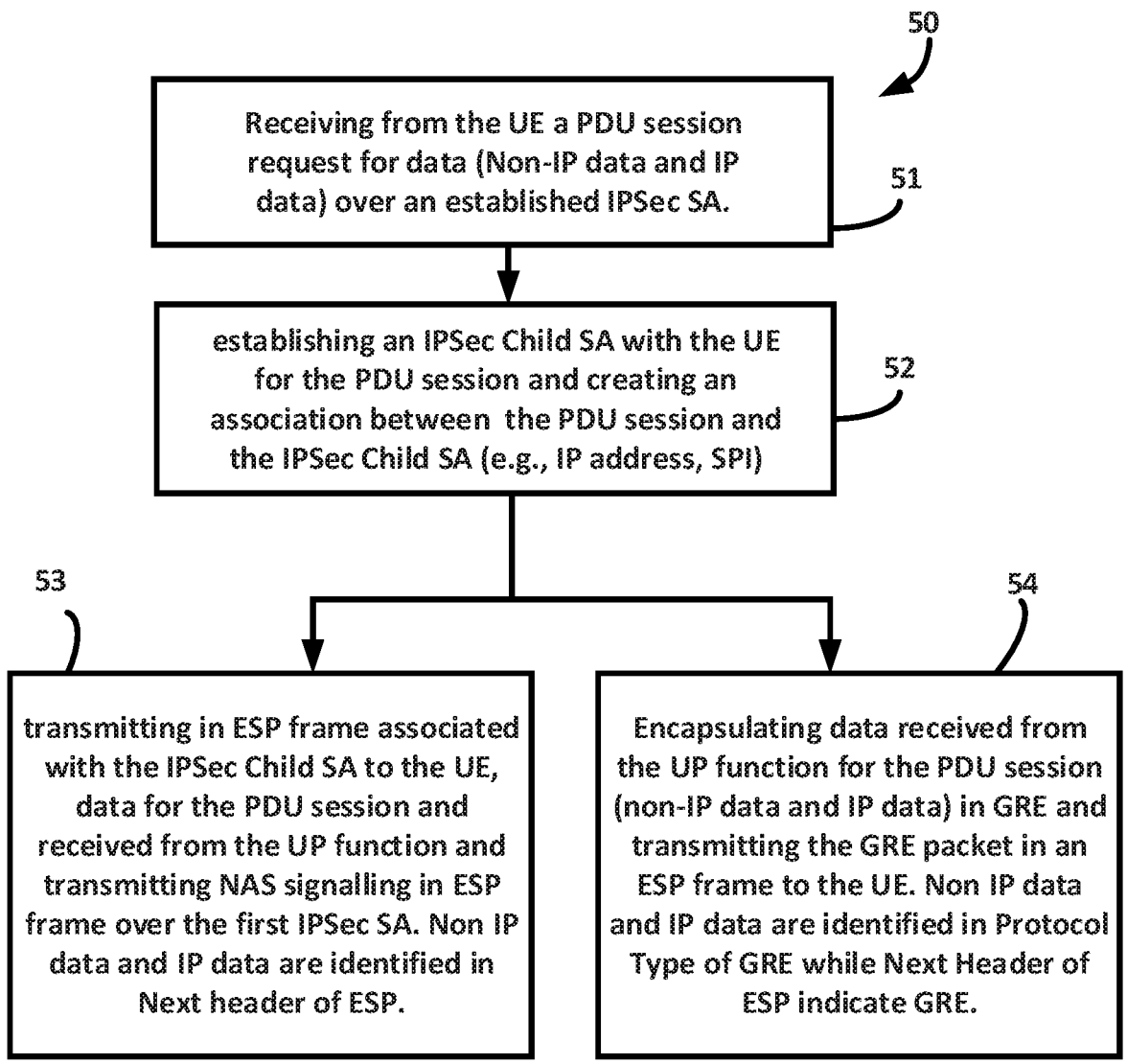
FIG. 5a illustrates an exemplary method at a N3IWF for establishing a PDU session and transport of the PDU data according to one embodiment.

FIG. 5a illustrates a method 50 executed at the Network entity, N3IWF for establishing a PDU session for the UE with 5GCN. At step 51, the N3IWF is already attached and has established a (first) IPSec SA with the UE. The N3IWF receives a NAS PDU session request message from the UE over the established (first) IPSec SA. The request indicates the PDU session is for non-IP data or IP data, it may also indicate the application type/identifier or the IoT device identifier responsible for the data. The N3IWF extracts the PDU session request and sends it to other CN CP functions over NG2 for further processing. The N3IWF also sends over NG2 to the CN CP functions additional parameters such as the IP address assigned by N3IWF for the NG3 tunnel towards the UP functions. Upon receiving over the NG2 interface from the CN CP function a PDU session response comprising the PDU session related parameters, the N3IWF determines based on the PDU session related parameters that an IPsec child SA should be established to transport the data for the PDU session. The PDU session parameters comprise the UE IP address(es) assigned for the PDU session, the IP address of the NG3 tunnel that should be established with the UP function and may include QoS parameters such as diffserv code point or more granular QoS to assign for tunnelled traffic towards the UP functions and for the PDU session. The PDU session parameters may also include an application server IP address associated with the non-IP data if the PDU type of the requested PDU session indicate that the PDU will transport raw non-IP data. The N3IWF at step 52 establishes an IPSec Child SA with the UE for the PDU session. It may send an IKE Create-Child SA request to the UE to establish the IPSec child SA. The N3IWF receives the IKE Create-Child SA response from the UE to indicate the IPSec child SA is established. The IKE CREATE_CHILD_SA exchange comprises a pair of Request-Response messages (IKE Create-Child SA request/response) and is cryptographically protected using the cryptographic algorithms and keys negotiated in the initial IKE exchange carried out at establishment of the first IPSec SA as illustrated at step 110 of FIG. 2. The N3IWF may include a CFG_REPLY Configuration Payload (CP) in the IKE CREATE_CHILD_SA request to identify the assigned IP address(es) for the UE. If the PDU session request included an identifier for the PDU session, the N3IWF may also include the same identifier in the IKE CREATE_CHILD_SA request or exchange to allow mapping of the PDU session data to the IPSec Child SA. To complete the PDU session establishment, the N3IWF sends the NAS PDU session response to the UE which comprises the assigned UE IP address for the session and may also include the SPI value of the Child IPsec SA if the PDU session response is transmitted over the (first) IPSec SA. Alternatively, the N3IWF may not initiate establishment of the IPSec child SA, but instead proceeds with sending the PDU session response over the first IPSec SA to the UE. The UE then initiates the IKE CREATE_CHILD_SA exchange to establish the IPSec child SA with the N3IWF for the PDU session.

The N3IWF may create a PDU session-IPSec child SA association comprising the UE IP address(es) assigned for the PDU session, the child SA (e.g., SPI) and optionally the application type/identifier or other identifier such as the IoT identity if obtained from the UE.

At steps 53, 54, the N3IWF receives data (non-IP and IP data) to be transmitted over the established IPSec child SA. The N3IWF encapsulates the data (non-IP data or IP data) in the ESP tunnel, it may apply GRE encapsulation (step 54) or the like prior to encapsulating the data in ESP frame. Note that If GRE is used to encapsulate the data (step 54), the PDU session request and response messages may include information regarding using the GRE encapsulation such as the GRE keys or any other relevant information to allow the N3IWF to encapsulate and decapsulate the data over the GRE tunnel.

If PDU session data is encapsulated natively in ESP of the IPSec Child SA, i.e., no GRE is used (step 53), the ESP payload is identified as non-IP data or IP data (more granular identification can be used, such raw non-IP data and framed non-IP data, etc) by appropriately setting the next header field in EPS. The NAS signalling transported using the first IPSec SA is identified in the next header of ESP as NAS signalling.

If PDU session data over the IPSec Child SA is encapsulated in GRE and further encapsulated in ESP (step 54), the ESP header may simply indicate GRE. The Protocol Type field in the GRE header is used to identify the type of payload. This field currently carries the EtherType, which may be used to indicate the type of payload or data (IP data or non-IP data). If further indication is needed as to whether the non-IP data is raw non-IP data or framed non-IP data, an additional value could be used to indicate the type of non-IP data. The EtherType could be used to distinguish NAS signaling when GRE is used for NAS signaling on the first IPsec SA.

At steps 53 and 54, the ESP encapsulated data (with or without GRE inner encapsulation) is tunnelled to the UE over the child IPSec tunnel (or child SA). If GRE is not used, the N3IWF can also distinguish NAS signalling and PDU session data using the SPI value as NAS signalling is carried over its own IPSec SA.

When the N3IWF receives non-IP data encapsulated in ESP or GRE in ESP associated to the IPSec child SA from the UE, the N3IWF retrieves the non-IP data from the ESP encapsulation and may either tunnel the non-IP data over the NG3 tunnel towards the UP functions for further routing, or if the corresponding PDU session-IPSec child SA association in the N3IWF include an application server address, the N3IWF encapsulates the non-IP data in an IP header comprising the application server address as the destination address in the IP header of the encapsulation and the UE IP address as the source IP address in the IP header of the encapsulation, and tunnels the encapsulated non-IP data to UP functions over the NG3 interface. Similarly, the N3IWF retrieves data received over the NG3 tunnel from the UP function, if the data is non-IP data, it determines based on the destination IP address of the packet (which is the UE IP address) the IPSec child SA over which the non-IP data should be sent to the UE. Once the IPSec child SA is identified, the N3IWF may apply GRE encapsulation prior to transmitting it in ESP frame of the IPSec child SA to the UE, the non-IP data is identified in the next header of the ESP trailer or the EtherType of GRE if used.

Figure 5B:
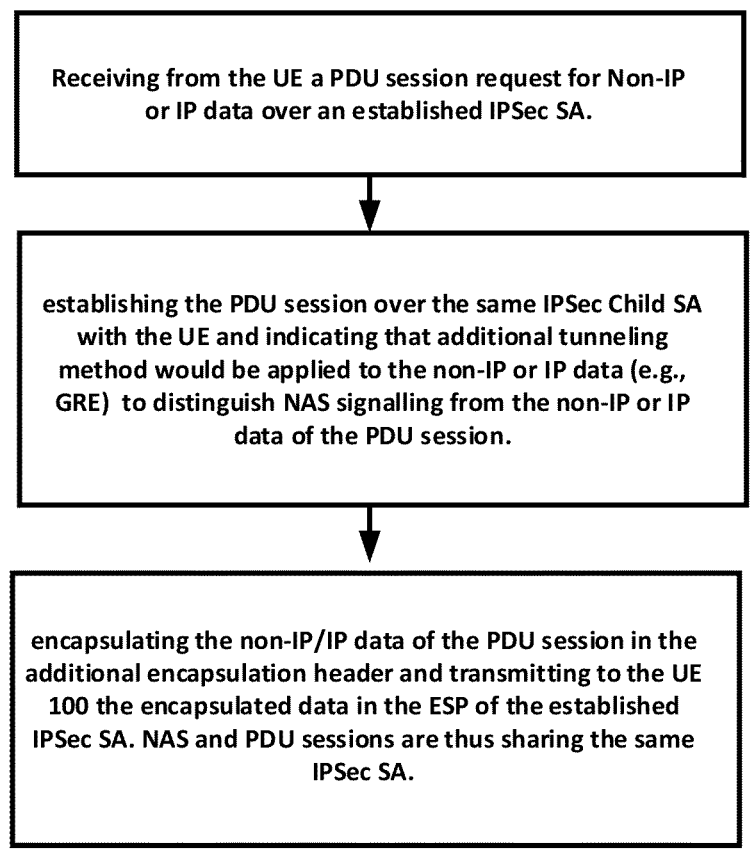
FIG. 5b illustrates an exemplary method at a N3IWF for establishing a PDU session and transport of the PDU data according to another embodiment.

In another embodiment illustrated in FIG. 5b, the N3IWF does not establish a child SA for the PDU session, instead, the PDU session for the non-IP data uses the same established first IPSec SA as illustrated at step 110 of FIG. 2. Note that a PDU session for IP data and the PDU session for non-IP data may share the same IPSec SA in this case. The same IPSec SA is also used for NAS signalling. A method in N3IWF would be needed to differentiate the signalling from the data and further a method to differentiate between IP data and non-IP data would be required. The next header field in the ESP trailer of the IPSec SA, indicates either NAS signalling or indicates tunnelled data associated with the PDU session. Alternatively, the next header field in the ESP trailer may simply indicate tunnelled traffic, where traffic encompasses both NAS and data of the PDU session. The tunnelled data consists of data that is further encapsulated using an inner encapsulation method prior to applying an outer ESP encapsulation. The N3IWF may use GRE encapsulation or the likes as an inner encapsulation method to first encapsulate the data of the PDU session and optionally NAS signalling as well. The field indicating the type of payload encapsulated within GRE, indicates NAS if NAS is encapsulated, IP-data if IP data is encapsulated, or non-IP data if non-IP data is encapsulated. It may even indicate raw non-IP data or raw application data to further distinguish between different types of non-IP data. For NAS or data of the PDU session received from the UE, the N3IWF checks the type of data from the ESP Next header field and the GRE field that indicates the payload type. NAS signalling is routed over NG2 interface data (Non-IP or IP) is routed over NG3 interface.

Figure 6:
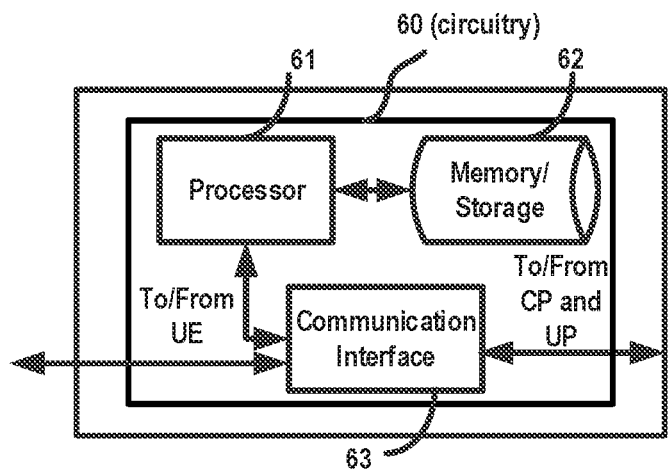
FIG. 6 illustrates a circuitry of an N3IWF according to one embodiment.

In one embodiment illustrated in FIG. 6, a N3IWF 103 comprises a circuitry 60 which executes the method steps according to the embodiments as described in FIGS. 5a and 5b, along with steps 110-113 and 115-117 of FIG. 2 in addition to other embodiments described herein. In one embodiment, the circuitry 60 may comprise a processor 61 and a storage 62 (also referred to as memory) containing instructions, which when executed, cause the processor 60 to perform the steps in a method according to embodiments described herein. The circuitry 60 may further comprise a communication interface 63 to communicate with external entities such as with UE devices using IKEv2 protocol and IPSec, with CN CP function using NG2 interface and UP function using NG3 interface. The embodiments described herein can also be executed in a virtualized embodiment of the N3IWF 103. As used herein, a "virtualized" N3IWF 103 is an implementation of the N3IWF 103 in which at least a portion of the functionality of the N3IWF 103 is implemented as a virtual component(s) (e.g., via a virtual machine (s) executing on a physical processing node(s) in a network (s)).

Figure 7:
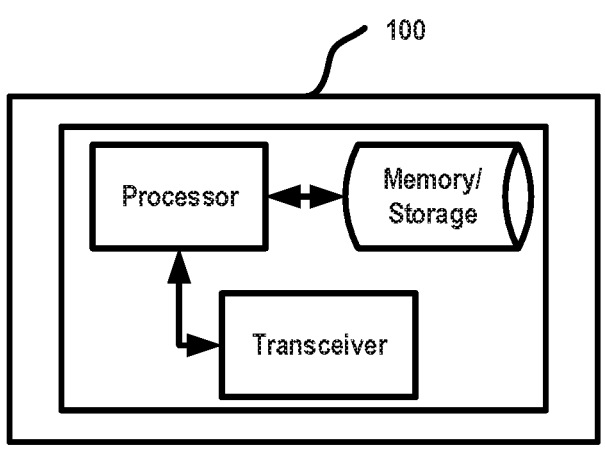
FIG. 7 illustrates a circuitry of a UE according to one embodiment.

FIG. 7 is a block diagram of an exemplary UE 100, in accordance with certain embodiments. UE 100 includes circuitry which may comprise a transceiver, one or more processors, and memory. In some embodiments, the transceiver facilitates transmitting wireless signals to and receiving wireless signals from the N3PP access 102 (e.g., via an antenna), and transmit and receive data from N3IWF 103 over the NGu interface (IPsec tunnel). The one or more processors execute instructions to provide some or all of the functionalities described above as being provided by the UE 100, and the memory stores the instructions for execution by the one or more processors.

The one or more processors may include any suitable combination of hardware and software implemented in one or more modules to execute instructions and manipulate data to perform some or all of the described functions of the UE 100, such as steps 110, 111, 112, 116 and 117 of FIG. 2 and method 400 in FIG. 4a and embodiment of FIG. 4b. In some embodiments, the one or more processors may include, for example, one or more computers, one or more central processing units (CPUs), one or more processors, one or more applications, one or more application specific integrated circuits (ASICs), one or more field programmable gate arrays (FPGAs) and/or other logic. In some embodiments, a computer program including instructions which, when executed by at least one processor, causes the at least one processor to carry out the functionality of the UE 100 according to any of the embodiments described herein is provided. In some embodiments, a carrier comprising the aforementioned computer program product is provided. The carrier is one of an electronic signal, an optical signal, a radio signal, or a computer readable storage medium (e.g., a non-transitory computer readable medium such as memory).

The memory is generally operable to store instructions, such as a computer program, software, an application including one or more of logic, rules, algorithms, code, tables, etc. and/or other instructions capable of being executed by one or more processors. Examples of memory include computer memory (for example, Random Access Memory (RAM) or Read Only Memory (ROM)), mass storage media (for example, a hard disk), removable storage media (for example, a Compact Disk (CD) or a Digital Video Disk (DVD)), and/or or any other volatile or non-volatile, non-transitory computer-readable and/or computer-executable memory devices that store information, data, and/or instructions that may be used by the one or more processors of the UE 100.

Other embodiments of the 100 may include additional components beyond those shown in FIG. 7 that may be responsible for providing certain aspects of the wireless device's functionality, including any of the functionality described above and/or any additional functionality (including any functionality necessary to support the solution described above). As just one example, the UE 100 may include input devices and circuits, output devices, and one or more synchronization units or circuits, which may be part of the one or more processors. Input devices include mechanisms for entry of data into the UE 100. For example, input devices may include input mechanisms, such as a microphone, input elements, a display, etc. Output devices may include mechanisms for outputting data in audio, video and/or hard copy format. For example, output devices may include a speaker, a display, etc.

Figure 8A:
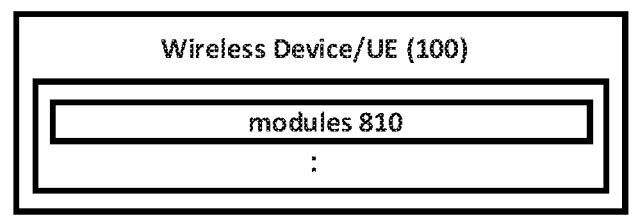
FIG. 8a illustrates a UE according to another embodiment.

In an embodiment illustrated in FIG. 8a for the UE 100, the one or more processors may comprise one or more modules 810 implemented in software. The module(s) provide functionality of the UE 100 in accordance with the embodiments described herein, and in accordance with the steps executed at the UE 100 in FIG. 2 and the method 400 of FIG. 4a and embodiment of FIG. 4b.

Figure 8B:
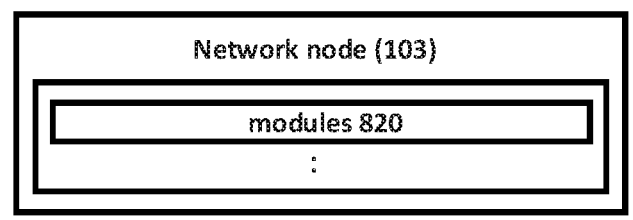
FIG. 8b illustrates a network node implementing N3IWF according to another embodiment.

In an embodiment illustrated in FIG. 8b for a network node implementing N3IWF 103, the one or more processors may comprise one or more modules 820 implemented in software. The module(s) provide functionality of the N3IWF 103 in accordance with the embodiments described herein, and in accordance with the steps executed at the N3IWF 103 in FIG. 2 and the method 50 of FIG. 5a and embodiment of FIG. 5b.

While not being limited thereto, some example embodiments of the present disclosure are provided below.

Embodiment 1. A method of operation (400) of a wireless device (100) attached to a Next Generation Core network, 5GCN, for establishing a PDU session over a non 3GPP access, comprising:
initiating a PDU session request to establish a PDU session over an established first IPsec security association, SA;
establishing an IPSec child security association, SA, for the PDU session and associating the child SA to a PDU session response obtained from the 5GCN; and
prior to transmitting data to 5GCN, encapsulating transmitted data using the IPSec Child SA and indicating the type of the transmitted data in the encapsulation.

Embodiment 2. The method of embodiment 1 wherein the PDU session request includes the application type or application identifier to identify the transmitted data for the PDU session.

Embodiment 3. The method of embodiment 1 wherein the step of establishing an IPSec Child SA further comprises receiving an IKE Create_Child SA request message over the established IPSec SA which comprises the one or more assigned IP address for the PDU session.

Embodiment 4. The method of embodiment 3 wherein associating the child SA to a PDU session response obtained from the 5GCN corresponds to creating an association between the PDU session and the child SA by correlating the one or more IP address received in the IKE Create_Child SA request to one or more IP address assigned to the PDU session and received in the PDU session response.

Embodiment 5. The method of embodiment 1, where in the PDU session response comprise the security parameter Index, SPI, of the child SA.

Embodiment 6. The method of embodiment 5, wherein associating the child SA to a PDU session response obtained from the 5GCN corresponds to creating an association between the PDU session and the child SA by correlating the SPI received in the IKE Create_Child SA request to the SPI received in the PDU session response.

Embodiment 7. The method of embodiment 1, wherein the transmitted data is raw non-IP data.

Embodiment 8. The method of embodiment 7, wherein the next header in the Child SA encapsulation header indicate raw non-IP data.

Embodiment 9. The method of embodiment 1, wherein initiating a PDU session is triggered by raw data received from an Internet of Thing device that does not support Internet Protocol, IP.

Embodiment 10. A wireless device (100), comprising:
at least one transceiver;
at least one processor; and
memory comprising instructions executable by the at least one processor whereby the wireless device (100) is operable to:
initiate a PDU session request to establish a PDU session over an established first IPsec security association, SA;
establish an IPSec child security association, SA, for the PDU session and associate the child SA to a PDU session response obtained from the 5GCN; and
prior to transmitting data to 5GCN, encapsulate transmitted data using the IPSec Child SA and indicate the type of the transmitted data in the encapsulation.

Embodiment 11. A wireless device (100) adapted to:
initiate a PDU session request to establish a PDU session over an established first IPsec security association, SA;

establish an IPSec child security association, SA, for the PDU session and associate the child SA to a PDU session response obtained from the 5GCN; and prior to transmitting data to 5GCN, encapsulate transmitted data using the IPSec Child SA and indicate the type of the transmitted data in the encapsulation.

Embodiment 12. The wireless device (100) of embodiment 11 wherein the wireless device (100) is further adapted to operate according to the method of any one of embodiments 2 to 9.

Embodiment 13. A method of operation (50) of a next generation packet data gateway, N3IWF, (103) in a next generation core network, 5GCN, comprising:

receiving a PDU session request from a user equipment (100) over an established first IPSec security Association, SA, assigning a user plane, UP, address for a corresponding tunnel to a user plane entity in the 5GCN and transmitting the PDU session request to a control plane entity in the 5GCN;

upon receiving PDU session related information comprising a PDU session response, an assigned IP address for the UE (100) and an address identifying a termination end of the corresponding tunnel at the user plane entity, initiating establishment of an IPSec Child SA for the PDU session with the UE (100) and sending the PDU session response to the UE (100) over the established first IPSec SA;

creating an association between the PDU session and the IPSec Child SA; and retrieving transmitted data from the UE (100) over the IPSec Child SA and tunneling the transmitted data to the user plane entity in the 5GCN.

Embodiment 14. The method of embodiment 13 wherein the PDU session request includes the application type or application identifier to identify the transmitted data for the PDU session over the child SA.

Embodiment 15. The method of embodiment 13 or 14 wherein the PDU session related information comprise an application server address for further encapsulating the transmitted data from the UE (100) over the corresponding tunnel to the UP function.

Embodiment 16. The method of embodiment 15, wherein the transmitted data is raw non-IP data.

Embodiment 17. The method of embodiment 13 wherein the step of initiating an IPSec Child SA further comprises sending an IKE Create_Child SA request message which comprises the one or more assigned IP address for the PDU session.

Embodiment 18. The method of embodiment 13 or 17 wherein creating an association between the PDU session and the IPSec Child SA further comprises creating a mapping between the one or more IP address assigned for the PDU session and the child SA.

Embodiment 19. The method of embodiment 13, where in the security parameter Index, SPI, of the child SA is included in the PDU session response sent the UE (100).

Embodiment 20. A next generation packet data gateway, N3IWF, (103) in a next generation core network, 5GCN, comprising:

at least one processor; and memory comprising instructions executable by the at least one processor whereby the N3IWF (103) is operable to:

receive a PDU session request from a user equipment (100) over an established first IPSec security Association, SA, assigning a user plane, UP, address for a corresponding tunnel to a user plane, UP, entity in the 5GCN and transmitting the PDU session request to a control plane entity in the 5GCN;

upon the N3IWF (103) receives PDU session related information comprising a PDU session response, an assigned IP address for the UE (100) and an address identifying a termination end of the corresponding tunnel at the UP entity, initiate establishment of an IPSec Child SA with the UE (100) for the PDU session and send the PDU session response to the UE (100) over the established first IPSec SA;

create an association between the PDU session and the IPSec Child SA; and retrieve transmitted data from the UE (100) over the IPSec Child SA and tunnel the transmitted data to the user plane entity in the 5GCN.

Embodiment 21. A next generation packet data gateway, N3IWF, (103) in a next generation core network, 5GCN, adapted to:

receive a PDU session request from a user equipment (100) over an established first IPSec security Association, SA, assigning a user plane, UP, address for a corresponding tunnel to a user plane, UP, entity in the 5GCN and transmitting the PDU session request to a control plane entity in the 5GCN;

upon the N3IWF (103) receives PDU session related information comprising a PDU session response, an assigned IP address for the UE (100) and an address identifying a termination end of the corresponding tunnel at the UP entity, initiate establishment of an IPSec Child SA with the UE (100) for the PDU session and send the PDU session response to the UE (100) over the established first IPSec SA;

create an association between the PDU session and the IPSec Child SA; and retrieve transmitted data from the UE (100) over the IPSec Child SA and tunnel the transmitted data to the user plane entity in the 5GCN.

Embodiment 22. The N3IWF (103) of embodiment 21 wherein the N3IWF (103) is further adapted to operate according to the method of any one of embodiments 14-19.

Those skilled in the art will recognize improvements and modifications to the embodiments of the present disclosure. All such improvements and modifications are considered within the scope of the concepts disclosed herein.

Acronyms:

The following acronyms and definitions are used throughout this disclosure.

3GPP Third Generation Partnership Project
5G Fifth Generation
5GCN 5G Core Network
4G Fourth Generation
AF Application Function
AMF Access and Mobility Function
CPU Central Processing Unit
CN Core Network
CP Control plane
DN Data Network
EAP Extended Authentication Protocol
eLTE Evolved LTE
eNB Enhanced or Evolved Node B
ESP Encapsulating Security Payload
EUTRAN Evolved Universal Terrestrial Radio Access Network FPGA Field Programmable Gate Array
gNB next generation NodeB
IKEv2 Internet Key Exchange Protocol version 2
IoT Internet of Things
IPSec Internet Protocol Security
L1 Layer one
L2 Layer two
LTE Long Term Evolution
MM Mobility Management
MME Mobility Management Entity
N3IWF Non-3GPP Interworking Function
N3PP Non-3GPP Access
NF Network Function
NG Next Generation
NgPDG Next Generation Packet Data gateway
NR New Radio
5GCN Next Generation Core network
PDG Packet Data Gateway
PDU Packet Data User plane/Unit
RAN Radio Access Network
RAT Radio Access Technology
SA Security Association
SD Subscriber Database
SM Session Management
SPI Security Parameter Index
SQN Sequence Number
UE User Equipment
UP User Plane
USB Universal Serial Bus
WiFi Wireless Fidelity
WLAN Wireless Local Area Network

What is claimed:

1. A method of operation of a wireless device attached to a third partnership project, 3GPP, network, for establishing a Packet Data Unit, PDU, session over a non 3GPP access, comprising:
    sending a Non-Access Stratum, NAS PDU session request message to establish a PDU session for transporting data of a particular type over an established Internet Protocol Security, IPsec, Security Association, SA;
    establishing an IPSec Child SA, for the PDU session and using at least one of a security parameter Index of the IPSec Child SA, an IP address assigned to the PDU session or a PDU session identifier for associating the IPSec Child SA to the established PDU session; and
    encapsulating data to be transmitted for the PDU session wherein a type of encapsulated data is provided and the type corresponds to the particular type of data identified for the PDU session.

2. The method of claim 1, wherein said encapsulating data to be transmitted further comprises adding to the data an Encapsulation Security Payload, ESP, frame corresponding to the IPSec Child SA.

3. The method of claim 2, wherein the type of encapsulated data is provided in a next header field in the ESP frame.

4. The method of claim 1, wherein encapsulating data to be transmitted further comprises encapsulating the data by an inner encapsulation header and adding to the encapsulated data an Encapsulation Security Payload, ESP, frame corresponding to the IPSec Child SA.

5. The method of claim 4, wherein the inner encapsulation header is a Generic Routing Encapsulation (GRE) Header.

6. The method of claim 4, wherein a type of encapsulated data is provided in a protocol type field of the GRE header.

7. The method of claim 1 wherein the PDU session request includes an application type or an application identifier of an application generating the data for the PDU session.

8. The method of claim 1 wherein the step of establishing the IPSec Child SA further comprises receiving an Internet Key Exchange Create_Child Security Association (IKE Create Child SA) request message of an IKE Child SA exchange.

9. The method of claim 1 wherein the step of establishing the IPSec Child SA further comprises sending an IKE Create_Child SA request message of the IKE Child SA exchange.

10. The method of claim 8 wherein the method further comprises obtaining the IP address assigned to the PDU session during the IKE Child SA exchange.

11. The method of claim 1 wherein said associating the IPSec Child SA to the PDU session further comprises correlating the IP address obtained in the IKE Child SA exchange to an IP address assigned to the PDU session and received in a NAS PDU session response in response to the NAS PDU session request.

12. The method of claim 1, wherein the method further comprises receiving a NAS PDU session response in response to the NAS PDU session request wherein the NAS PDU session response comprises the security parameter Index, SPI, of the IPSec Child SA.

13. The method of claim 12, wherein said associating the IPSec Child SA to the PDU session further comprises correlating the SPI received in the IKE Child SA exchange to the SPI received in the NAS PDU session response.

14. The method of claim 1, wherein sending the PDU session is initiated as a result of receiving the data from an Internet of Thing, IoT, device connected to the wireless device.

15. The method of claim 1, wherein the data of the particular type comprises one of non-Internet Protocol, non-IP framed data, non-IP raw data and IP data.

16. The method of claim 1, wherein the NAS PDU session request and any other NAS message is encapsulated in a Generic Routing Encapsulation (GRE) Header when transmitted as in an ESP frame over the established IPSec SA.

17. A wireless device, comprising:
    at least one transceiver;
    at least one processor; and
    memory comprising instructions executable by the at least one processor whereby the wireless device is operable to:
        send a Non-Access Stratum Packet Data Unit, NAS PDU session request to establish a PDU session to transport data of a particular type over an established Internet Protocol Security, IPsec, Security Association, SA;
        establish an IPSec Child SA, for the PDU session and use at least one of a security parameter Index of the IPSec Child SA, an IP address assigned to the PDU session or a PDU session identifier to associate the IPSec Child SA to the established PDU session; and
        encapsulate data to be transmitted for the PDU session by adding an encapsulation header to the data wherein a type of encapsulated data is provided and the type corresponds to the particular type of data identified for the PDU session.

18. The wireless device of claim 17, wherein the encapsulation header is a Generic Routing Encapsulation, GRE, header.

19. The wireless device of claim 18 wherein the NAS PDU session request and other NAS messages are transmitted encapsulated in the GRE header and further encapsulated in an ESP frame corresponding to the established IPSec SA.

20. The wireless device of claim 17, wherein a NAS PDU session response received in response to the NAS PDU session request, comprises information related to the encapsulation header.

21. A network entity, comprising:
    at least one processor; and
    memory comprising instructions executable by the at least one processor whereby the network entity is operable to:
        receive a Non Access Stratum, Packet Data Unit, NAS PDU, session request from a UE to establish a PDU session to transport data of a particular type over an Internet Protocol Security, IPsec, Security Association, SA established with the UE;
        establish an IPSec Child SA for the PDU session and use at least one of a security parameter Index of the IPSec Child SA, an IP address assigned to the PDU session or a PDU session identifier to associate the IPSec Child SA to the established PDU session; and
        encapsulate data to be transmitted for the PDU session to the UE and indicate the type of data to be transmitted as the data of the particular type.

22. The network entity of claim 21, wherein the network entity is further adapted to encapsulate data to be transmitted by encapsulating the data in an inner encapsulation header and adding to the encapsulated data an Encapsulation Security Payload, ESP, frame corresponding to the IPSec Child SA.

23. The network entity of claim 22, wherein the inner encapsulation header is a Generic Routing Encapsulation (GRE) Header.

24. The network entity of claim 23, wherein indicating the type of data further comprises setting a protocol type field in the GRE header to a value corresponding to the data of the particular type.

25. The network entity of claim 21, wherein the PDU session request includes an application type or an application identifier of an application generating the non-IP data for the PDU session.

* * * * *